United States Patent [19]

Haruna et al.

[11] Patent Number: 5,077,328

[45] Date of Patent: Dec. 31, 1991

[54] POLYOLEFIN RESIN COMPOSITION

[75] Inventors: Tohru Haruna; Takashi Takeuchi, both of Saitama, Japan

[73] Assignee: Asahi Denka Kogyo K.K., Tokyo, Japan

[21] Appl. No.: 645,714

[22] Filed: Jan. 25, 1991

[30] Foreign Application Priority Data

Feb. 1, 1990 [JP] Japan ................................ 2-22674

[51] Int. Cl.$^5$ ................................................ C08K 5/34
[52] U.S. Cl. .................................... 524/100; 524/228; 524/232; 524/335; 524/336; 524/451; 524/583; 524/584
[58] Field of Search ............... 524/232, 335, 336, 100, 524/228

[56] References Cited

U.S. PATENT DOCUMENTS 4,487,871 12/1984 Ishihashi et al. ................... 524/100
4,985,480 1/1991 Fukui et al. ......................... 524/108

FOREIGN PATENT DOCUMENTS 61-233033 10/1986 Japan ................................ 524/232
64-69653 3/1989 Japan ................................ 524/335

*Primary Examiner*—Joseph L. Schofer
*Assistant Examiner*—Mark D. Sweet
*Attorney, Agent, or Firm*—DePaoli & O'Brien

[57] ABSTRACT

A filler-containing polyolefin resin composition comprising a resin composition composed of a polyolefin resin and an inorganic filler exhibits an excellent thermal stability despite the presence of the inorganic filler by adding thereto a particular phenolic antioxidant, an amide or monoglyceride compound of a higher fatty acid and a particular metal inactivating agent.

14 Claims, No Drawings

POLYOLEFIN RESIN COMPOSITION

BACKGROUND OF THE INVENTION

1. Field of the Invention

The present invention relates to a stabilized composition of an inorganic filler-containing polyolefin. More particularly, the present invention is concerned with a polyolefin resin composition stabilized against accelerated deterioration attributable to the incorporation therein of an inorganic filler.

2. Description of the Prior Art

Polyolefin resins, such as polyethylene, polypropylene, polybutene-1 or poly-4-methylpentene, have excellent mechanical properties and have been used as the materials, of manufacture for various molded articles, films and fibers. Various antioxidants, such as phenolic, thioether, phosphite or phosphonite antioxidants, have hitherto been used for the purpose of preventing thermal oxidative deterioration of the above-described polyolefin resins.

In particular, when the above-described polyolefin resins are used for manufacturing various molded articles, for example, automotive parts and electrical components, inorganic fillers, such as talc or calcium carbonate, are often incorporated in the polyolefin resins for the purpose of improving tensile strength, bending strength, rigidity, thermal deformation temperature, dimensional stability, etc. It is known, however, that these inorganic filler-containing polyolefin resins are remarkably inferior in mechanical properties, thermal stability, etc., to the polyolefin resin free from any inorganic filler.

This is thought to be due to poor affinity of the inorganic filler for the polyolefin resin. For this reason, treatment of the surface of the inorganic filler with a fatty acid ester of a polyhydric alcohol or the like, or the addition of this fatty acid ester or the like in combination with the inorganic filler has been disclosed in, for example, Japanese Patent Laid-Open Nos. 49254/1977 and 80345/1977. However, the lowering of thermal stability could not be prevented through the mere treatment of the inorganic filler with the above-described compound.

It is further believed that the lowering of thermal stability is due to the influence of minute amounts of heavy metals contained in the inorganic filler, or copper, iron, etc., with which the polyolefin comes into contact when used as parts of industrial machines. In order to inhibit the unfavorable action caused by the above-described heavy metals, metal inactivating agents, for example, melamine, guanamine, benzoguanamine, 3-salicyloylaminotriazole, N,N'-dibenzylidene(oxalic dihydrazide), N-salicyloyl-N'-salicylidenehydrazine, bissalicyloylhydrazine, bis[β-(3,5-di-tert-butyl-4-hydroxyphenyl)propionyl]hydrazine, dodecanedioic acid bis(salicyloylhydrazide) and bis[β-(3,5-di-tert-butyl4-hydroxyphenyl)propionyloxyethyl]oxamide, have been used in combination with various antioxidants.

Although the combined use of an antioxidant and a metal inactivating agent results in an improvement to some extent when no inorganic filler is incorporated in the polyolefin resin, the effect is quite insufficient when inorganic filler is incorporated, so that the combination is far from being satisfactory from the viewpoint of practical use.

U.S. Pat. No. 3,553,158 has suggested that the lowering of thermal stability caused by the above-described incorporation of the inorganic filler is due to the adsorption of the phenolic antioxidant on the inorganic filler used and proposed the use of the phenolic antioxidant in combination with compounds having a polar group, such as an epoxy compound, an amide compound, an ether compound, a sulfide compound, a hydroxy compound or an ester compound for the purpose of preventing the adsorption. Based on a similar concept, Japanese Patent Publication No. 50981/1980 has proposed the use of an antioxidant comprising a hindered phenol ester of isocyanuric acid because the polyolefin resin is less susceptible to a decrease in thermal stability caused by the incorporation of the inorganic filler, in combination with an ester of thiodipropionic acid and the above-described compound having a polar group. Japanese Patent Laid-Open No. 188543/1989 has proposed the use of an epoxy compound in addition to the combination of an antioxidant and a metal inactivating agent; and Japanese Patent Laid-Open No. 282232/1989 has proposed the use of a particular phenolic antioxidant in combination with an amide compound.

In the methods described in the above-described publications, although the thermal stability is improved to some extent, the effect is insufficient and, further, the coloration of the resin composition is often significantly unfavorable, so that prior art methods are unsatisfactory from the viewpoint of practical use.

SUMMARY OF THE INVENTION

The present inventors have made intensive studies with a view to solving the above-described problems and, as a result, have found that the use of a particular phenol ester antioxidant in combination with an amide compound or a momoglyceride compound of a higher aliphatic carboxylic acid and a particular metal inactivating agent not only remarkably improves the thermal stability of a filled polyolefin resin, even to the extent that the stabilizing effect is equal to that achieved in an unfilled polyolefin resin, but the stabilizer combination also does not result in the coloration of the resin composition.

Further, the filled polyolefin resin composition of the present invention has stability equal to that of an unfilled resin even under the severe conditions of when such composition comes into contact with heavy metals, such as copper or iron.

Accordingly, the present invention provides a filler-containing polyolefin resin composition comprising 100 parts by weight of a resin composition composed of 98 to 35% by weight of a polyolefin resin and 2 to 65% by weight of an inorganic filler; and, incorporated therein, (a) 0.01 to 5 parts by weight of a phenolic compound represented by the following general formula (I):

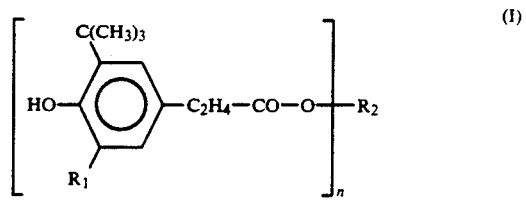

wherein $R_1$ is an alkyl group having 1 to 4 carbon atoms, n is an integer of 1 to 4, and $R_2$ is a mono- to tetrahydric alcohol residue, (b) 0.001 to 5 parts by weight of at least one member selected from the group consisting of higher fatty acid amide compounds and higher fatty acid monoglyceride compounds, and (c) 0.001 to 5 parts by weight of at least one metal inactivating agent selected from the group consisting of N,N'-bis[β-(3,5-di-tert-butyl-4-hydroxyphenyl)propionyloxyethyl]oxamide and melamine.

DESCRIPTION OF THE PREFERRED EMBODIMENTS

The phenolic compound used as component (a) represented by the above-described general formula (I), the higher fatty acid amide compound or higher fatty acid glyceride compound as component (b), and the metal inactivating agent as component (c) each have a very low toxicity. Accordingly, the polyolefin resin composition of the present invention can be used advantageously without problem in applications such as food packaging containers, where there is a fear of toxicity of additives.

The present invention having the above-described subject matter will now be described in more detail.

There is no particular limitation on the inorganic filler which can be used in the present invention. Commonly used fillers for polyolefin resins include various metal oxides, metal hydroxides, metal carbonates, metal sulfates, metal silicates, silicate minerals, carbides and ceramics. There is no particular limitation also on the particle diameter of the above-described inorganic filler which is used. The mean particle diameter, however, is generally 20 μm or less, preferably 0.05 to 5 μm. Specific examples of inorganic fillers include titanium oxide, zinc oxide, aluminum hydroxide, magnesium hydroxide, light or heavy calcium carbonate, magnesium carbonate, calcium silicate, magnesium silicate, celite, kaolin, zeolite, clay, talc, silica, diatomaceous earth, quartz sand, slate powder, mica powder, asbestos, alumina, alumina white, aluminum sulfate, barium sulfate, calcium sulfate, molybdenum disulfide, graphite, glass fiber, glass bead, carbon fiber, carbon black, fly ash and potassium titanate.

The amount of addition of the above-described fillers is 2 to 65% by weight, preferably 10 to 50% by weight based on the total amount of the polyolefin resin and the inorganic filler.

Examples of the phenolic antioxidant represented by the above-described general formula (I) include stearyl β-(3,5-di-tert-butyl-4-hydroxyphenyl)propionate, stearyl β-(3-tert-butyl-4-hydroxy-5-methylphenyl)propionate, 1,6-hexamethylenebis[β-(3,5-di-tert-butyl-4-hydroxyphenyl)propionate], triethylene glycol bis[β-(3-tert-butyl-4-hydroxy-5-methylphenyl)propionate], 3,9-bis[1,1-dimethyl-2-(β-3-tert-butyl4-hydroxy-5-methylphenyl)propionyloxy)ethyl]2,4,8,10-tetraoxaspiro[5.-5]undecane, 1,3,5-tris[β-3,5-di-tert-butyl-4-hydroxyphenyl)propionyloxyethyl] isocyanurate and tetrakis[-methylene-62 -(3,5-di-tertbutyl-4-hydroxyphenyl)propionate]methane.

The amount of addition of the phenolic antioxidant is 0.01 to 5 parts by weight, preferably 0.05 to 3 parts by weight based on 100 parts by weight of the filler-containing polyolefin resin composition.

The higher fatty acid amide compound and higher fatty acid glyceride compound used in the present invention can be made from the higher aliphatic carboxylic acid including aliphatic carboxylic acids having 12 or more carbon atoms, such as lauric, myristic, palmitic, stearic, oleic, 12-hydroxystearic, linoleic, ricinoleic, behenic, erucic and montanic acids, and further mixtures mainly composed of the above-described higher aliphatic carboxylic acids, e.g., fatty acids derived from natural oils and fats, such as soybean oil fatty acid, tallow fatty acid, rapeseed oil fatty acid, linseed oil fatty acid and castor oil fatty acid.

The higher fatty acid amide compound used in the present invention is represented by the following formula (II) and includes higher fatty acid (alkyl or alkenyl) amides and alkylenebis(higher fatty acid amide):

wherein R—CO— is an acyl group derived from the above-described higher fatty acids, R' is a hydrogen atom, an alkyl group, an alkenyl group or -(CH$_2$)$_m$—NH—CO—R, and m is 1 to 6.

Examples of higher fatty acid amide compounds useful in the present invention include lauramide, myristamide, palmitamide, stearamide, behenamide, erucamide, montanamide, stearylerucamide, oleylpalmitamide, methylenebis(stearamide), ethylenebis(myristamide), ethylenebis(palmitamide) and ethylenebis(stearamide).

The higher fatty acid monoglyceride compound used in the present invention is mainly composed of a monoester compound of the above-described higher fatty acid with glycerin. Commercially available higher fatty acid monoglyceride contains diglyceride and triglyceride in addition to monoglyceride. In the present invention, the higher fatty acid monoglyceride may be used as it is without refining as long as the monoglyceride component content is about 50% by weight or more.

The amount of addition of the higher fatty acid amide compound or higher fatty acid monoglyceride compound is 0.001 to 5 parts by weight, preferably 0.01 to 3 parts by weight based on 100 parts by weight of the filler-containing polyolefin resin composition.

The above-described higher fatty acid amide compounds or higher fatty acid monoglyceride compounds are known as lubricants for synthetic resins. However, other lubricants, for example, waxes, higher fatty acids, metal salts of higher fatty acids, esters of higher fatty acids with monohydric alcohols and triglycerides of higher fatty acids do not exhibit any effect of improving the thermal stability of filled polyolefin resins. Therefore, the effect of the higher fatty acid amide compound or higher fatty acid monoglyceride compound used in the present invention is very unique.

The metal inactivating agent used in the present invention is melamine and/or bis[β-(3,5-di-tert-butyl4-hydroxyphenyl)propionyloxyethyl]oxamide. These compounds are characterized not only by remarkable superiority to other known metal inactivating agents in improving the thermal stability of filled polyolefin resins but also by a very low toxicity.

The amount of addition of the above-described metal inactivating agents is 0.001 to 5 parts by weight, preferably 0.01 to 3 parts by weight based on 100 parts by weight of the filler-containing polyolefin resin composition.

The polyolefin resin used in the present invention is a homopolymer of an α-olefin, such as ethylene, propylene, butene-1, hexene-1 or 4-methylpentene-1, or a random or block copolymer of two or more thereof. Specific examples thereof include high-density, medium-density, low-density and straight-chain low-density polyethylenes, polypropylene, polybutene-1, polyisobutylene, poly-3-methylbutene-1, poly-4-methylpentene-1, ethylenepropylene copolymer, ethylene-butene-1 copolymer, ethylene-4-methylpentene-1 copolymer, propylenebutene-1 copolymer and ethylene-propylenebutene-1 copolymer. In the case of copolymers, the above-described α-olefins may be copolymerized with a polyunsaturated monomer such as a conjugated or nonconjugated diene, acrylic acid, methacrylic acid and vinyl acetate. The above-described polyolefin resins are prepared by known polymerization processes and may be those subjected to the step of removing a catalyst, or those prepared in the presence of a Ziegler catalyst wherein magnesium chloride called a highly active catalyst is used as a support, and not subjected to the step of removing a catalyst.

Other general additives for polyolefins may be added to the composition of the present invention in such an amount that it does not spoil the purpose of the present invention. Examples of these additives which may be added to the polyolefin resin composition of the present invention include phenolic antioxidants other than the compounds represented by the above-described general formula (I); thioether antioxidants; phosphorus-containing organic stabilizers such as organic phosphite compounds; ultraviolet absorbers such as benzophenone, benzotriazole and benzoate ultraviolet absorbers; hindered amine light stabilizers; metal soaps such as calcium stearate, calcium stearyllactate, zinc stearate and sodium stearate; hydrotalcites; nucleating agents such as aluminum p-tert-butylbenzoate, dibenzylidenesorbitol, di-p-methylbenzylidenesorbitol, sodium bis(4-tert-butylphenyl) phosphate and sodium 2,2'-methylenebis(4,6-di-tert-butylphenyl) phosphate; antistatic agents; flame retardants; and pigments.

Examples of the phenolic antioxidant include 2,6-di-tert-butyl-p-cresol, 2,2'-methylenebis(4-methyl-6-tert-butylphenol), 2,2'-methylenebis(4-ethyl-6-tertbutylphenol), 2,2'-ethylidenebis(4,6-di-tertbutylphenol), 2,2'-ethylidenebis(4-sec-butyl-6-tertbutylphenol), bis[3,3-bis(4-hydroxy-3-tertbutylphenyl)butyric acid] glycol ester, 4,4'-butylidenebis(6-tert-butyl-m-cresol), 4,4'-thiobis(6tert-butyl-m-cresol), 1,1,3-tris(2-methyl-4-hydroxy5-tert-butylphenyl)butane, 1,3,5-tris(3,5-di-tert-butyl- 4-hydroxybenzyl)-2,4,6-trimethylbenzene, 1,3,5-tris(2,6-dimethyl-3-hydroxy-4-tert-butylbenzyl) isocyanurate and 1,3,5-tris(3,5-di-tert-butyl-4-hydroxybenzyl) isocyanurate.

Examples of the thioether antioxidant include dialkyl thiodipropionates, such as dilauryl thiodipropionate, dimyristyl thiodipropionate and distearyl thiodipropionate, and esters of alkyl(C$_8$-C$_{18}$)thiopropionic acid such as pentaerythritol tetra(dodecylthiopropionate).

Examples of the phosphorus-containing stabilizers, such as an organic phosphite compound, include tris(-nonylphenyl) phosphite, tris(mono- and di-nonylphenyl) phosphite, tris(2,4-di-tertbutylphenyl) phosphite, tetra(C$_{12-15}$ mixed alkyl) bisphenol A diphosphite, tetra(tridecyl) 4,4'-butylidenebis(3-methyl-6-tert-butylphenol)diphosphite, hexa(tridecyl) 1,1,3-tris(2-methyl-5-tert-butyl-4-hydroxyphenyl)butane triphosphite, distearyl pentaerythritol diphosphite, bis(2,4-di-tertbutylphenyl) pentaerythritol diphosphite, bis(2,6-di-tert-butyl-4-methylphenyl) pentaerythritol diphosphite, 2,2'-ethylidenebis(4,6-di-tert-butylphenyl) fluorophosphite, 2,2'-methylenebis(4,6-di-tert-butylphenyl) octyl phosphite and tetrakis(2,4-di-tert-butylphenyl)-biphenylene diphosphite.

Examples of the ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy5'-methylphenyl)benzotriazole, 2-(2'-hydroxy-5'-tertoctylphenyl)benzotriazole, 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3',5'-dicumylphenyl)benzotriazole and 2,2'-methylenebis(4-tert-octyl-6benzotriazolyl)phenol; benzoates such as phenyl salicylate, resorcinol monobenzoate, 2,4-di-tertbutylphenyl 3',5'-di-tert-butyl-4'-hydoxybenzoate and hexadecyl 3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl α-cyano-β,β-diphenylacrylate and methyl 2-cyano-3-methyl-3-(p-methoxyphenyl)acrylate.

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) butanetetracarboxylate, tetrakis(1,2,2,6,6-pentamethyl-4-piperidyl) 1,2,3,4-butanetetracarboxylate, bis(2,2,6,6-tetramethyl-4-piperidyl) di(tridecyl) 1,2,3,4-butanetetracarboxylate, bis(1,2,2,6,6-pentamethyl-4-piperidyl) di(tridecyl) 1,2,3,4-butanetetracarboxylate, bis(1,2,2,6,6-pentamethyl-4-piperidyl) 2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-tert-octylamino-s-triazine polycondensate, and 1,6-bis(2,2,6,6-tetramethyl-4-piperidylamino)hexane/2,4-dichloro-6-morpholino-s-triazine polycondensate.

When an inorganic filler is incorporated into a polyolefin resin, the thermal stability of the resin is much lower than that of the unfilled resin. In filled polyolefin resins, the effect of improving the thermal stability is small even when a metal inactivating agent or an amide compound is added alone. Further, in some cases, the combined use of a metal inactivating agent and an amide compound other than those specified in the present invention exhibits a better effect than that of the combination specified in the present invention when no filler is added. This stabilizing effect, however, remarkably decreases when a filler is added, and is unsatisfactory from the viewpoint of practical use. Further, when use is made of a phenolic antioxidant other than the particular phenolic antioxidant specified in the present invention, the decrease in stability caused by the addition of a filler is significant.

By contrast, the polyolefin resin composition containing the particular metal inactivating agent, higher fatty acid amide compound or higher fatty acid monoglyceride compound in combination with the particular phenolic antioxidant as specified in the present invention, exhibits an excellent stabilizing effect and has a thermal stability substantially equal to the unfilled resin. This demonstrates that the effect of the present invention is a very unique one attained only when use is made of the combination of particular compounds as specified in the present invention.

The present invention will now be described in more detail by way of the following Examples. The present invention is not to be limited to these Examples only.

EXAMPLE 1

In order to examine the effect attained by the use of talc as an inorganic filler, the following formulation ingredients were sufficiently mixed and extruded under conditions of 250° C. and 20 rpm to prepare a pellet. This pellet was injection molded at 250° C. to prepare a test piece having a thickness of 1 mm. This test piece was subjected to a thermal stability test in a Geer oven at 160° C. to measure the time taken for the deterioration of the test piece.

For comparison, the same test was conducted on a test piece in which no talc was used in the formulation.

The results are given in Table 1.

| Formulation: | |
|---|---|
| polypropylene | 70 parts by weight |
| talc of food additive grade | 30 parts by weight |
| tetrakis[methylene-β-(3,5-di-tert-butyl-4-hydroxyphenyl)propionate]methane | 0.1 parts by weight |
| dilauryl thiodipropionate | 0.2 parts by weight |
| melamine | 0.05 parts by weight |
| sample compound | 0.3 parts by weight |

TABLE 1

| No. | Sample compound | Thermal stability hour |
|---|---|---|
| Comp. Ex. | | |
| 1-1 | free | 96 |
| 1-2 | free (melamine not added) | 72 |
| 1-3 | free (talc not added) | 744 |
| 1-4 | bisphenol A diglycidyl ether | 432 |
| 1-5 | bisphenol A diglycidyl ether (talc not added) | 744 |
| 1-6 | bisphenol A diglycidyl ether (melamine not added) | 408 |
| 1-7 | erucamide (talc not added) | 744 |
| 1-8 | erucamide (melamine not added) | 360 |
| 1-9 | stearic acid monoglyceride (talc not added) | 744 |
| Ex. | | |
| 1-1 | stearamide | 696 |
| 1-2 | erucamide | 720 |
| 1-3 | N-stearylerucamide | 672 |
| 1-4 | ethylenebis (stearamide) | 720 |
| 1-5 | stearic acid monoglyceride | 696 |
| 1-6 | behenic acid monoglyceride | 672 |

EXAMPLE 2

In order to examine the difference in the effect when the kinds of the phenolic antioxidants were varied, the same test as that of Example 1 was conducted according to the following formulation.

The results are given in Table 2.

| Formulation: | |
|---|---|
| polypropylene | 70 parts by weight |
| talc of food additive grade | 30 parts by weight |
| erucamide | 0.3 parts by weight |
| melamine | 0.05 parts by weight |
| dilauryl thiodipropionate | 0.2 parts by weight |
| phenolic antioxidant | 0.1 parts by weight |

TABLE 2

| No. | Phenolic antioxidant | Thermal stability hour |
|---|---|---|
| Comp. Ex. | | |
| 2-1 | 1,1,3-tris(3-tert-butyl-4-hydroxy-6-methylphenyl)butane | 144 |
| 2-2 | 1,1,3-tris(3-tert-butyl-4-hydroxy-6-methylphenyl)butane (talc not added) | 360 |
| 2-3 | 1,3,5-tris(3,5-di-tert-butyl-4-hydroxybenzyl) isocyanurate | 312 |
| 2-4 | 1,3-5-tris(3,5-di-tert-butyl-4-hydroxybenzyl) isocyanurate (talc not added) | 648 |
| 2-5 | 1,3-5-tris(3,5-di-tert-butyl-4-hydroxybenzyl)-2,4-6-trimethylbenzene | 288 |
| 2-6 | 1,3,5-tris(3,5-di-tert-butyl-4-hydroxybenzyl)-2,4,6-trimethylbenzene (talc not added) | 504 |
| 2-7 | stearyl β-(3,5-di-tert-butyl-4-hydroxyphenyl)propionate (talc not added) | 384 |
| 2-8 | tetrakis methylene-β-(3,5-di-tert-butyl-4-hydroxyphenyl)propionate]methane (talc not added) | 744 |
| Ex. | | |
| 2-1 | stearyl β-(3,5-di-tert-butyl-4-hydroxyphenyl)propionate | 360 |
| 2-2 | 1,6-hexamethylene bis[β-(3,5-di-tert-butyl-4-hydroxyphenyl)propionate] | 504 |
| 2-3 | 3,9-bis[1,1-dimethyl-2-(3-(3-tert-butyl-4-hydroxy-5-methylphenyl)-propionyloxy)ethyl]-2,4,8,10-tetraoxaspiro[5.5]undecane | 864 |
| 2-4 | tetrakis[methylene-β-(3,5-di-tert-butyl-4-hydroxyphenyl)propionate]-methane | 720 |

EXAMPLE 3

In order to examine the effect when talc was used as the inorganic filler and the kind of the metal inactivating agent was varied, a test piece having a thickness of 1 mm was prepared from the following formulation ingredients in the same manner as that of Example 1.

This test piece was subjected to a thermal stability test in a Geer oven at 160° C. and a copper foil contact test wherein the test piece was bound to a copper foil and heated in a Geer oven at 150° C., thus measuring the time taken for the deterioration of the test piece. For comparison, the same test was conducted on a test piece in which no talc was added.

The results are given in Table 3.

| Formulation: | |
|---|---|
| polypropylene | 70 parts by weight |
| talc of food additive grade | 30 parts by weight |
| tetrakis[methylene-β-(3,5-di- | 0.1 parts by weight |

| Formulation: | |
|---|---|
| tert-butyl-4-hydroxyphenyl)-propionate]methane | |
| distearyl thiodipropionate | 0.2 parts by weight |
| ethylenebis(stearamide) | 0.2 parts by weight |
| metal inactivating agent | 0.05 parts by weight |

TABLE 3

| No. | Metal inactivating agent | Thermal stability 160° C. hour | copper contact hour |
|---|---|---|---|
| Comp. Ex. | | | |
| 3-1 | free | 336 | 24 |
| 3-2 | free (talc not added) | 744 | 48 |
| 3-3 | 3-salicyloylamino-1,2,4-triazole | 432 | 600 |
| 3-4 | 3-salicyloylamino-1,2,4-triazole (talc not added) | 864 | 816 |
| 3-5 | N,N'-bis[3-(3,5-di-tert-butyl-4-hydroxyphenyl)propionyl]hydrazine | 648 | 528 |
| 3-6 | N,N'-bis[3-(3,5-di-tert-butyl-4-hydroxyphenyl)propionyl]hydrazine (talc not added) | 936 | 768 |
| 3-7 | melamine (talc not added) | 744 | 600 |
| 3-8 | N,N'-bis[3-(3,5-di-tert-butyl-4-hydroxyphenyl)propionyloxyethyl]oxamide (talc not added) | 864 | 744 |
| Ex. | | | |
| 3-1 | melamine | 720 | 576 |
| 3-2 | N,N'-bis[3-(3,5-di-tert-butyl-4-hydroxyphenyl)propionyloxyethyl]oxamide | 840 | 696 |

EXAMPLE 4

In order to examine the difference in the effect when the kinds of the phenolic antioxidants were varied, a test piece having a thickness of 1 mm was prepared from the following formulation ingredients in the same manner as that of Example 1.

This test piece was subjected to a thermal stability test in a Geer oven at 160° C. to measure the time taken for the deterioration of the test piece.

The results are shown in Table 4.

| Formulation: | |
|---|---|
| polypropylene | 70 parts by weight |
| talc of food additive grade | 30 parts by weight |
| tetrakis[methylene-β-(3,5-di-tert-butyl-4-hydroxyphenyl)propionate]methane | 0.2 parts by weight |
| dilauryl thiodipropionate | 0.2 parts by weight |
| erucamide | 0.1 parts by weight |
| melamine | varied |

TABLE 4

| No. | Amt. of addition of melamine | Thermal stability hour |
|---|---|---|
| Comp. Ex. | | |
| 4-1 | 0 | 288 |
| Ex. | | |
| 4-1 | 0.02 | 480 |
| 4-2 | 0.03 | 600 |
| 4-3 | 0.05 | 888 |
| 4-4 | 0.1 | 1020 |
| 4-5 | 0.2 | 1050 |
| 4-6 | 0.3 | 1100 |

What is claimed is:

1. A filler-containing polyolefin resin composition comprising 100 parts by weight of a resin composition composed of 98 to 35% by weight of a polyolefin resin and 2 to 65% by weight of a filler; and, incorporated therein, (a) 0.01 to 5 parts by weight of a phenolic compound represented by the following general formula (I):

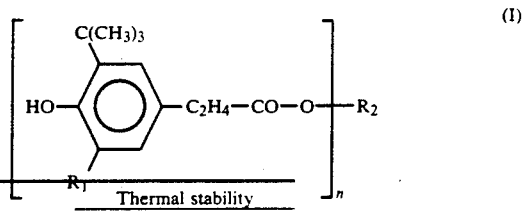

wherein $R_1$ is an alkyl group having 1 to 4 carbon atoms, n is an integer of 1 to 4, and $R_2$ is a mono- to tetrahydric alcohol residue, (b) 0.001 to 5 parts by weight of at least one member selected from the group consisting of higher fatty acid amide compounds and higher fatty acid monoglyceride compounds, and (c) 0.001 to 5 parts by weight of at least one metal inactivating agent selected from the group consisting of N,N'-bis[β-(3,5-di-tert-butyl-4-hydroxyphenyl)propionyloxyethyl] oxamide and melamine.

2. A polyolefin resin composition according to claim 1, wherein the phenolic compound as the component (a) is tetrakis[methylene-β-(3,5-di-tert-butyl-4-hydroxyphenyl)propionate]methane.

3. A polyolefin resin composition according to claim 1, wherein the phenolic compound as the component (a) is 3,9-bis[1,1-dimethyl-2-(β-3-tertbutyl-4-hydroxy-5-methylphenyl)propionyloxy)ethyl]2,4,8,10-tetraoxaspiro[5.5]undecane.

4. A polyolefin resin composition according to claim 1, wherein the component (b) is a higher fatty acid amide compound.

5. A polyolefin resin composition according to claim 4, wherein the higher fatty acid compound is erucamide.

6. A polyolefin resin composition according to claim 4, wherein the higher fatty acid amide compound is ethylenebis(stearamide).

7. A polyolefin resin composition according to claim 1, wherein the metal inactivating agent as the component (c) is melamine.

8. A polyolefin resin composition according to claim 1, wherein the inorganic filler is talc.

9. A polyolefin resin composition according to claim 1, which further comprises 0.01 to 5 parts by weight of a dialkyl ester of thiodipropionic acid.

10. A polyolefin resin composition according to claim 9, wherein the dialkyl ester of thiodipropionic acid is dilauryl thiodipropionate.

11. A polyolefin resin composition according to claim 9, wherein the dialkyl ester of thiodipropionic acid is distearyl thiodipropionate.

12. A polyolefin resin composition according to claim 1, wherein the polyolefin resin is polypropylene.

13. A polyolefin resin composition comprising 100 parts by weight of a resin composition composed of 98 to 35% by weight of polypropylene and 2 to 65% by weight of talc and, incorporated therein, (a) 0.01 to 5 parts by weight of tetrakis[methylene-β-(3,5)-di-tert-butyl-4-hydroxyphenyl)propionate]methane, (b) 0.001 to 5 parts by weight of a higher fatty acid amide compound and (c) 0.001 to 5 parts by weight of melamine.

14. A polyolefin resin composition comprising 100 parts by weight of a resin composition composed of 98 to 35% by weight of polypropylene and 2 to 65% by weight of talc and, incorporated therein, (a) 0.01 to 5 parts by weight of tetrakis[methylene-β-(3,5)-di-tert-butyl- 4-hydroxyphenyl)propionate]methane, (b) 0.001 to 5 parts by weight of a higher fatty acid amide compound, (c) 0.001 to 5 parts by weight of melamine, and (d) 0.01 to 5 parts by weight of a dialkyl ester of thiodipropionic acid.

* * * * *